(12) United States Patent
Wang

(10) Patent No.: US 10,732,200 B2
(45) Date of Patent: *Aug. 4, 2020

(54) MICRO INERTIAL MEASUREMENT SYSTEM

(71) Applicant: SZ DJI TECHNOLOGY CO., LTD., Shenzhen (CN)

(72) Inventor: Tao Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,782

(22) Filed: Nov. 13, 2018

(65) Prior Publication Data

US 2019/0079113 A1 Mar. 14, 2019

Related U.S. Application Data

(63) Continuation of application No. 14/940,721, filed on Nov. 13, 2015, now Pat. No. 10,132,827, which is a
(Continued)

(30) Foreign Application Priority Data

Aug. 9, 2010 (CN) .......................... 2010 1 0250948

(51) Int. Cl.
*G01P 1/02* (2006.01)
*G01P 15/18* (2013.01)
(Continued)

(52) U.S. Cl.
CPC ............ *G01P 15/14* (2013.01); *F16F 15/022* (2013.01); *F16F 15/04* (2013.01); *F16F 15/085* (2013.01);
(Continued)

(58) Field of Classification Search
CPC . G01P 15/18; G01P 15/14; G01P 1/02; G01C 21/16; F16F 15/04; F16F 15/085
See application file for complete search history.

(56) References Cited

U.S. PATENT DOCUMENTS 5,038,613 A 8/1991 Takenaka et al.
5,239,866 A 8/1993 Froidevaux
(Continued)

FOREIGN PATENT DOCUMENTS

CN 1322312 C 6/2007
CN 100381785 C 4/2008
(Continued)

OTHER PUBLICATIONS

Mark Euston, et al., A complementary Filter for Atitude Estimation of a Fixed-Wing UAV, IEEE, Sep. 22-26, 2008, 6 pages.
(Continued)

*Primary Examiner* — Helen C Kwok
(74) *Attorney, Agent, or Firm* — Anova Law Group, PLLC

(57) ABSTRACT

A micro inertial measurement system includes a housing, a sensing module, and a damper. The sensing module includes a rigid sensing support, a measuring and controlling circuit board mounted on the rigid sensing support and an inertial sensor set on the measuring and controlling circuit board. The inertial sensor includes a gyroscope and an accelerometer. The sensing module is mounted in the housing. The damper is mounted in the housing and set in the gap between the sensing module and the inside wall of the housing. By use of the above-mentioned structure, the noise immunity of the inertial measuring system can be greatly improved, and the volume and weight of the inertial measuring system can be greatly reduced.

20 Claims, 5 Drawing Sheets

Related U.S. Application Data continuation of application No. 13/809,407, filed as application No. PCT/CN2010/079483 on Dec. 6, 2010, now Pat. No. 9,213,046.

(51) Int. Cl.

| | | |
|---|---|---|
| G01P 15/14 | (2013.01) | |
| G01C 21/16 | (2006.01) | |
| F16F 15/04 | (2006.01) | |
| F16F 15/02 | (2006.01) | |
| F16F 15/08 | (2006.01) | |

(52) U.S. Cl.
CPC ................ *G01C 21/16* (2013.01); *G01P 1/02* (2013.01); *G01P 15/18* (2013.01)

(56) References Cited

U.S. PATENT DOCUMENTS

| | | | |
|---|---|---|---|
| 5,433,110 A | 7/1995 | Gertz et al. | |
| 6,195,261 B1 | 2/2001 | Babutzka et al. | |
| 6,918,297 B2 | 7/2005 | MacGugan | |
| 7,040,922 B2 * | 5/2006 | Harney | G01C 21/16 361/810 |
| 7,370,530 B2 | 5/2008 | Dcamp et al. | |
| 7,404,324 B2 | 7/2008 | Braman et al. | |
| 7,467,552 B2 | 12/2008 | MacGugan | |
| 7,536,909 B2 | 5/2009 | Zhao et al. | |
| 7,814,791 B2 | 10/2010 | Andersson et al. | |
| 8,037,754 B2 | 10/2011 | Eriksen et al. | |
| 8,266,960 B2 | 9/2012 | Braman et al. | |
| 8,371,534 B1 | 2/2013 | Goodzeit et al. | |
| 8,552,350 B2 | 10/2013 | Bielas et al. | |
| 8,640,541 B2 | 2/2014 | Abdel Aziz et al. | |
| 8,646,331 B2 | 2/2014 | Ohl et al. | |
| 8,960,000 B2 | 2/2015 | Sakuma et al. | |
| 9,079,662 B1 | 7/2015 | Duffy et al. | |
| 9,126,693 B1 | 9/2015 | Shi et al. | |
| 9,174,733 B1 | 11/2015 | Burgess et al. | |
| 9,213,046 B2 * | 12/2015 | Wang | G01C 21/16 |
| 9,280,038 B1 | 3/2016 | Pan et al. | |
| 9,297,438 B2 | 3/2016 | Meacham et al. | |
| 9,580,173 B1 | 2/2017 | Burgess et al. | |
| 9,664,516 B2 | 5/2017 | Song | |
| 9,665,094 B1 | 5/2017 | Russell | |
| 9,777,887 B2 | 10/2017 | Pan et al. | |
| 9,781,312 B2 | 10/2017 | Pan et al. | |
| 9,781,313 B2 | 10/2017 | Pan et al. | |
| 9,783,297 B2 | 10/2017 | Patrick et al. | |
| 10,132,827 B2 * | 11/2018 | Wang | G01C 21/16 |
| 2003/0070483 A1 | 4/2003 | Mueller | |
| 2004/0169244 A1 * | 9/2004 | MacGugan | B81B 7/0074 257/416 |
| 2005/0039529 A1 | 2/2005 | Jeanroy et al. | |
| 2007/0001282 A1 | 1/2007 | Kang et al. | |
| 2007/0032951 A1 * | 2/2007 | Tanenhaus | G01C 21/16 702/151 |
| 2007/0113702 A1 | 5/2007 | Braman et al. | |
| 2009/0255335 A1 | 10/2009 | Fly et al. | |
| 2009/0308157 A1 * | 12/2009 | Eriksen | G01C 21/16 73/504.04 |
| 2010/0037694 A1 * | 2/2010 | Grossman | F16F 15/046 73/526 |
| 2010/0059911 A1 | 3/2010 | Goepfert et al. | |
| 2012/0032286 A1 | 2/2012 | Trusov | |
| 2013/0110325 A1 | 5/2013 | Sapp, II et al. | |
| 2013/0111993 A1 | 5/2013 | Wang | |
| 2014/0032034 A1 | 1/2014 | Raptopoulos et al. | |
| 2014/0116234 A1 | 5/2014 | Jacq | |
| 2015/0158587 A1 | 6/2015 | Patrick et al. | |
| 2015/0336667 A1 | 11/2015 | Srivastava et al. | |
| 2016/0076892 A1 | 3/2016 | Zhou et al. | |
| 2016/0344981 A1 | 11/2016 | Lunt | |
| 2017/0030715 A1 | 2/2017 | Song et al. | |
| 2017/0075351 A1 | 3/2017 | Liu | |
| 2017/0089513 A1 | 3/2017 | Pan et al. | |
| 2017/0101178 A1 | 4/2017 | Lee | |
| 2017/0106978 A1 | 4/2017 | Sopper et al. | |
| 2017/0180729 A1 | 6/2017 | Wu | |
| 2017/0180754 A1 | 6/2017 | Wu et al. | |
| 2017/0259938 A1 | 9/2017 | Zhao et al. | |
| 2017/0261323 A1 | 9/2017 | Song et al. | |
| 2017/0334561 A1 | 11/2017 | Sopper et al. | |
| 2017/0336805 A1 | 11/2017 | Luo et al. | |
| 2018/0022456 A1 | 1/2018 | Patrick et al. | |

FOREIGN PATENT DOCUMENTS

| | | |
|---|---|---|
| CN | 101290226 A | 10/2008 |
| CN | 101290227 A | 10/2008 |
| CN | 101349564 A | 1/2009 |
| CN | 101403615 A | 4/2009 |
| CN | 101532840 A | 9/2009 |
| CN | 101655371 A | 2/2010 |
| CN | 201408009 Y | 2/2010 |
| CN | 101750065 A | 6/2010 |
| CN | 102121829 A | 7/2011 |
| CN | 101922938 B | 6/2012 |
| CN | 202274882 U | 6/2012 |
| CN | 102778232 A | 11/2012 |
| CN | 102918400 A | 2/2013 |
| CN | 102980584 A | 3/2013 |
| CN | 203037259 U | 7/2013 |
| CN | 103411615 A | 11/2013 |
| DE | 4136355 A1 | 5/1993 |
| DE | 102005047873 A1 | 4/2007 |
| DE | 602004006270 T2 | 1/2008 |
| EP | 1642365 B1 | 5/2007 |
| EP | 1530057 B1 | 2/2010 |
| EP | 2154393 A2 | 2/2010 |
| EP | 2752643 A1 | 7/2014 |
| JP | S63217787 A | 9/1988 |
| JP | H04208587 A | 7/1992 |
| JP | H0570001 A | 3/1993 |
| JP | H05149381 A | 6/1993 |
| JP | H0559873 U | 8/1993 |
| JP | H07306047 A | 11/1995 |
| JP | 11211481 A | 8/1999 |
| JP | 2002195834 A | 7/2002 |
| JP | 2002257552 A | 9/2002 |
| JP | 2002299545 A | 10/2002 |
| JP | 2006284336 A | 10/2006 |
| JP | 2013540987 A | 11/2013 |
| JP | 2014013207 A | 1/2014 |
| WO | 03029756 A1 | 4/2003 |
| WO | 2004079874 A1 | 9/2004 |
| WO | 2009129066 A2 | 10/2009 |
| WO | 2013029286 A1 | 3/2013 |

OTHER PUBLICATIONS

Barton, et al., Design, Fabrication and Testing of Miniaturised Wireless Inertial Measurement Units (IMU), 2007 Proceedings 57th Electronic Components and Technology Conference, Reno, NV 2007, pp. 1143-1148.

The United States Patent and Trademark Office (USPTO) Notice of Allowance for U.S. Appl. No. 14/390,008 dated Mar. 10, 2017.

The European Patent Office (EPO) European Search Report and Search Opinion for EP Application No. 14889856.2 dated Jan. 4, 2017.

Gavrilets, et al., Avionics system for a small unmanned helicopter performing aggressive maneuvers, Digital Avionics Systems Conference, 2000. Proceedings DASC, the 19th, vol. 1, IEEE, Oct. 2000.

Howard Loewen, Isolating Components from UAV Vibration, MicroPilot, Jan. 2013. Available at https://www.micropilot.com/pdf/isolating-components-uav-vibration.pdf. Accessed Dec. 22, 2016.

Mej Chris Reitsma, A novel approach to vibration isolation in small, unmanned aerial vehicles, InTechnologies for Practical Robot Applications, 2009, TePRA 2009, IEEE International Conference on Nov. 9, 2009 (pp. 84-87).

(56) References Cited

OTHER PUBLICATIONS

Translation of DE102005047873.
Barton, et al., Design, Fabrication and Testing of Miniaturised Wireless Inertial Measurement Units (IMU), 2007 Electronic Components and Technology Conference, pp. 1143-1148. Published Dec. 31, 2007.
The World Intellectual Property Organization (WIPO) International Search Report and Written Opinion for PCT/CN2014/076296 dated Feb. 6, 2015.
The World Intellectual Property Organization (WIPO) International Search Report for PCT/CN2010/079483 dated May 5, 2011.
The United States Patent and Trademark Office (USPTO) Notice of Allowance for U.S. Appl. No. 13/809,407 dated Sep. 23, 2015.
The United States Patent and Trademark Office (USPTO) Notice of Allowance U.S. Appl. No. 13/809,407 dated Oct. 6, 2015.
The United States Patent and Trademark Office (USPTO) Office Action for U.S. Appl. No. 13/809,407 dated Apr. 10, 2015.

* cited by examiner

US 10,732,200 B2

MICRO INERTIAL MEASUREMENT SYSTEM

CROSS-REFERENCE

This application is a continuation application of U.S. application Ser. No. 14/940,721, filed Nov. 13, 2015, which is a continuation application of U.S. application Ser. No. 13/809,407, filed Jan. 9, 2013, which is a U.S. National stage of PCT/CN2010/79483 filed on Dec. 6, 2010, which claims the priority of Chinese patent application No. 201010250948.4 filed on Aug. 9, 2010, the entire contents of all of which applications are incorporated herein by reference.

FIELD OF THE INVENTION

The present invention relates to strapdown inertial navigation technology used on carriers such as unmanned aerial vehicle (UAV). More particularly, the present invention relates to a micro inertial measurement system used in a strapdown inertial navigation.

BACKGROUND OF THE INVENTION

At present, strapdown inertial navigation is a type of booming and advanced navigation technology. Wherein, inertial elements including a gyroscope, an accelerometer and so on which are fixed to a carrier are directly used for measuring an acceleration of the carrier relative to an inertial reference system. Then the information on the speed, attitude angle and position in a navigation coordinate system can be achieved by an integral operation based on the Newton law of inertia, so as to guide the carrier from a start point to a destination. Besides, in the strapdown inertial navigation technology, mathematical operations comprising coordination transformation and differential equation solution on measured data by the gyroscope and the accelerometer are conducted by a control computer, in order to extract the attitude data and navigation data from elements in an attitude matrix to finish the navigation mission. In the strapdown inertial navigation system, a "mathematical platform" built based on updated data such as an updated strapdown matrix is in place of a traditional electromechanical navigation platform so as to achieve a simplified system structure significantly reduced system volume and cost as well as inertial elements easy to install and maintain. Moreover, the strapdown inertial navigation system is independent of external system support, thus obtaining the information about attitude, speed and position on its own. It doesn't radiate any information to outside neither. Therefore, due its advantages such as being real-time, independent, free of interruption, free of limitations of region, time and weather condition, as well as of comprehensive output parameters, it is widely applied in plurality of fields including aviation, sailing and traffic etc.

The strapdown inertial navigation system is usually composed of one inertial measurement system, one control computer, a control display and associated supporting components, wherein the inertial measurement system is the key component for such overall system. The inertial measurement system is equipped with a gyroscope and an accelerometer, and its operation principle is as follows: at first, triaxial angular speed of a carrier is detected by the gyroscope, and linear acceleration of a vehicle moving along the tri-axes is detected by the accelerometer; ever that, in order to calculate some voyage attitude information such as instantaneous heading and inclination angle, the signal of angular speed detected by the gyroscope is subjected to an integral operation with respect to time by the control computer on one hand; on the other hand, the signal of acceleration detected by the accelerometer is subjected to an integral operation with respect to time so as to calculate the instantaneous velocity information; finally, a secondary integration is carried out to calculate the distance and position in the voyage during this period of time.

The Inertial measurement system and its attitude solution technology are the key technical links that have an impact on properties of the strapdown inertial navigation system. This is because such inertial measurement and its attitude solution are the premises for controlling the track of the carrier. Thus, their precision and efficiency have a direct influence on the aging and precision of the navigation. Secondly, since the inertial measurement system has to bear vibration, impact and angular motion directly in a rigorous pneumatic environment, it is easy to bring about many destabilization effect and error effect, thereby becoming a weak link of the strapdown Inertial navigation system. Thirdly, there are some challenges such as micromation and industrialization for the strapdown inertial navigation system. In particular, with the development of microelectronic technology, it is required to employ micro electromechanical inertial components with intermediate precision or even low precision for the purpose of producing such strapdown inertial navigation product with low cost and in batches.

When the carrier tends to miniaturization and micromation, since its foundation mass is much smaller than that of a conventional carrier, it will subject to more excitation and random vibration in the voyage dynamic environment and become more instable compared with the conventional carrier. Accordingly, in order to overcome the drawbacks of instable navigation, reduced precision and even shortened service life of electronic components, some targeted technical measures which are mainly in the aspects of mechanical structure, damping design and micro technology have to be proposed for the inertial measurement system.

FIG. 1 is a structure diagram for an inertial measurement system employed in a strapdown inertial navigation system of a small-sized UAV In the prior art. Wherein, a sensing support 11 is fastened to the interior of a housing 12 through a fastening screw, a damping unit 13 is formed by four rubber blankets, and the housing is fixed to a vehicle at its bottom. The sensing support is composed of three pieces of gyro circuit board 111, 112 and 113 perpendicular to each other (referring to FIG. 2), on which are arranged three one-axis gyroscope 111a, 112a and 113a, respectively. The gyro circuit board 111 in the horizontal position is a combined one. It is further provided with a triaxial accelerometer 111b besides the gyro 111a. These three gyroscopes should be installed on three orthogonal planes with their sensing axes perpendicular to each other to form an orthogonal coordinate system for measurement. On the combined gyro circuit board 111, the measuring axis of the tri-axial accelerometer 111b is in parallel with that of the gyro 111a. The combined gyro circuit board 111 is in direct connection with a conditioning circuit board 114 and a master processor circuit board 115 through a connector.

FIG. 3 illustrates an equivalent analysis for the damping structure of the above mentioned inertial measurement system. In the figure, a mass block M represents the inertial measurement system and its centre of mass is the m; the damping unit is indicated by $\{K_i, c_i\}$ wherein the $K_i$ stands for rigidity, the $C_i$ stands for damping coefficient, and the subscript i stands for the number of the damping unit contained in a damper; since four rubber blankets are used as the damping units in the FIG. 1, i is equal to 1, 2, 3 and 4; B indicates a voyage carrier and P is the elastic centre of the damper. When the carrier B is during voyage, foundation excitation is produced for the inertial measurement system M. At this moment, in order to reduce the impact of the vibration of the carrier B onto the inertial measurement system M, the damping unit $\{K_i, c_i\}$ absorbs and consumes the forced vibration energy from the carrier B, and it starts an elastic movement up and down while taking the point P as a centre.

There are some problems for the above mentioned inertial measurement system:

(1) the sensing support is composed of three circuit boards separated from each other, thus taking up too much space and resulting in significant differences among the rigidity on the three axial directions;

(2) since the damping units are installed outside of the inertial measurement system, they take up extra space; more importantly, when the inertial measurement unit is forced to vibrate, it is easy to have torsional vibration due to unbalanced rigidity and irrational mechanical structure;

(3) for the damper, its ideal sphere of action is limited to one-axis direction, that is, it can only attenuate the vibration from the vertical direction while having no effective suppression on the vibration from any other directions; as a result, linear vibration and angular vibration in different degrees of freedom can be coupled together and the damping band becomes narrow.

SUMMARY OF THE INVENTION

Aiming at the above mentioned drawbacks in the prior art, the objective of the present invention is to solve the problems that the traditional inertial measurement system takes up too much space, it is easy to have torsional vibration and its damping frequency band is relatively narrow.

The technical solution for solving the above mentioned technical problems is as follows: a micro inertial measurement system is provided, comprising a housing, a sensing module and a damper; wherein the sensing module includes a rigid sensing support, a measuring and controlling circuit board mounted on the sensing support and an inertial sensor set on the measuring and controlling circuit board; the inertial sensor includes a gyroscope and an accelerometer; the sensing module is received in the housing; the damper is received in the housing and set in the gap between the sensing module and an inside wall of the housing.

In an advantageous solution of the present invention, the sensing support is a rigid support in the shape of cube and a groove is engraved on at least one of its surfaces; the measuring and controlling circuit board is a flexible measuring and controlling circuit board; at least a portion of circuit components on the flexible measuring and controlling circuit board is embedded in the groove on at least one surface.

In an advantageous solution of the present invention, six surfaces of the sensing support are all engraved with the groove; the number of the flexible measuring and controlling circuit board is up to six, and the flexible measuring and controlling circuit boards cover the surfaces of the sensing support respectively; the circuit components on each flexible measuring and controlling circuit board are embedded in the groove on the surface of its corresponding sensing support so as to make the flexible measuring and controlling circuit board cover each surface of the sensing support smoothly.

In an advantageous solution of the present invention, the sensing module also includes an anti-aliasing circuit and an A/D switching circuit set on the flexible measuring and controlling circuit board; the inertial sensor includes three gyroscopes and one accelerometer; such circuit modules in total are arranged on the flexible measuring and controlling circuit boards, respectively.

In an advantageous solution of the present invention, the flexible measuring and controlling circuit boards are integrated together to form a unitary structure, and they cover each surface of the sensing support completely after they have bent by an angle of 90° long the edges of the sensing support.

In an advantageous solution of the present invention, the damper includes at least two damping units that are arranged in the gap between one surface of the sensing module and the inside wall of the housing. Wherein, it is preferred that the damper comprises up to six damping units.

In advantageous solution of the present invention, the sensing module is hung at the centre of an inner cavity of the housing by up to six damping units, and the elastic centre P of the damper is coincident with the centroidal m of the sensing module.

In an advantageous solution of the present invention, the housing includes an upper housing with an opening at its lower part and a lower cover fit for the opening.

Due to the above mentioned technical solutions, the present invention has the following advantages: (1) not only the rigidity for the support is increased, but also the system mechanical structure is improved, as a result, the equal-rigidity vibration reduction in three dimensions is achieved, so that the noise immunity of the inertial measurement system can be greatly improved; (2) the vibration characteristics of the inertial measurement system is improved so that its inherent frequency is significantly distinguished from the operating frequency of sensitive components such as a shaker of the gyroscope; as a result, the relative amplitude for a mounting surface of the inertial sensor is reduced to be smallest; (3) the volume and weight of the inertial measurement system can be greatly reduced to expand the load space of the carrier.

DETAILED DESCRIPTION OF THE PREFERRED EMBODIMENT

Figure 1:
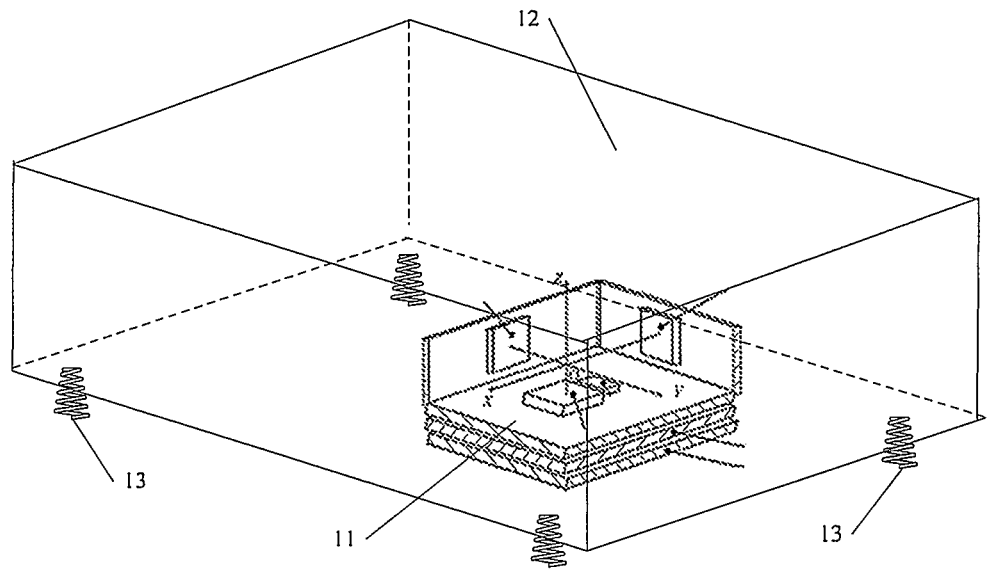
FIG. 1 is a structure diagram for a strapdown inertial measurement system of a small-sized UAV in the prior art.
Figure 2:
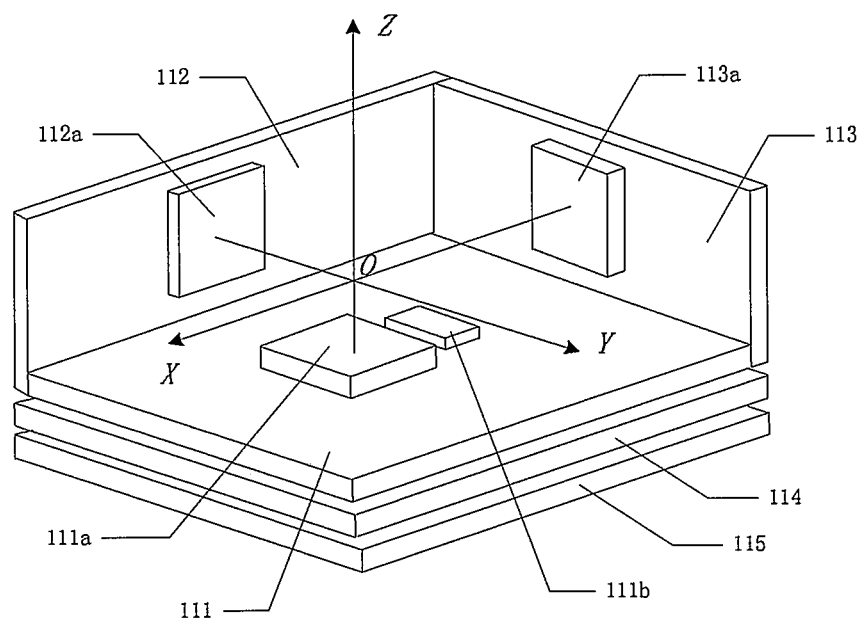
FIG. 2 is a structure diagram for a sensing support in the inertial measurement system of FIG. 1.
Figure 3:
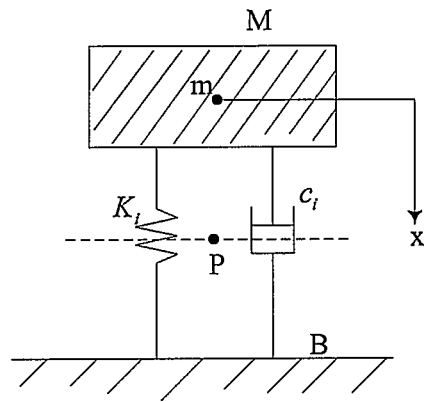
FIG. 3 is a schematic diagram for an equivalent model of a damper in the inertial measurement system of FIG. 1.
Figure 4:
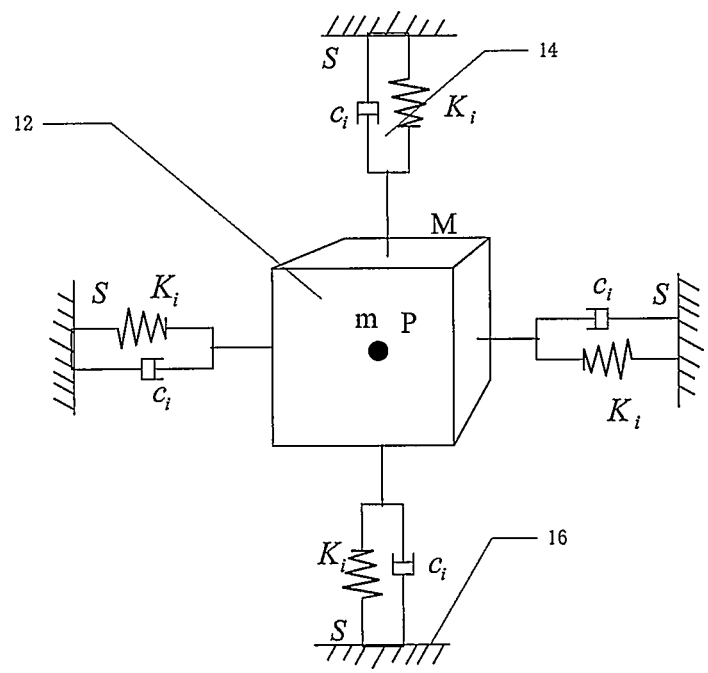
FIG. 4 illustrates the distribution of internal damping units of a damper in one embodiment of the present invention; wherein the S in the figure stands for an upper, a lower, a left and a right inside wall of a housing.
Figure 5:
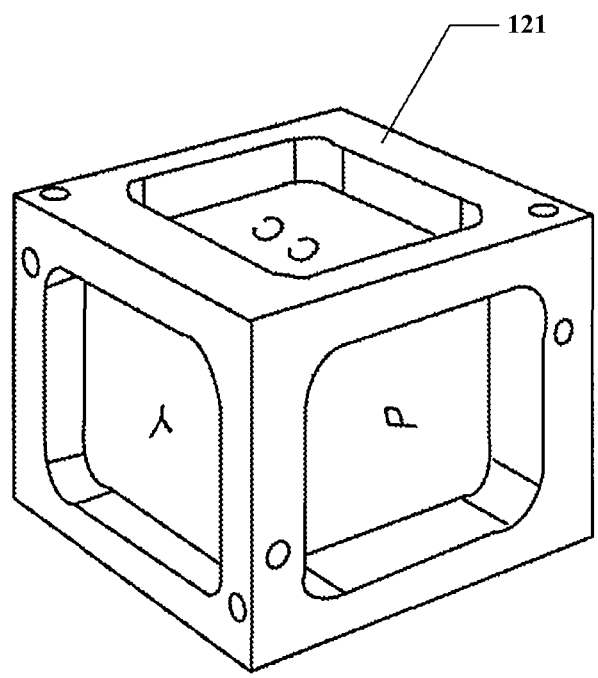
FIG. 5 is a schematic diagram for a sensing support in a preferred embodiment of the present invention.

During operation, in the mechanical environment for a strapdown inertial navigation system, the violent random vibration may often present. The vibration may induce instability of the system and damage to electronic components, which will impact on the system stability greatly. In order to reduce such impact produced by the violent random vibration of a carrier, which may damage electronic components or make an inertial measurement unit unstable, except that the connection stiffness between respective sensor circuit boards is strengthened, the inertial measurement unit is elastically connected to the carrier using a damper as a damping medium, so as to realize a desired damping effect. Since the selection of a damping mode influences both damping performance and measurement precision of the inertial navigation system, it is always an important link in its structure design. In various aspects of the present invention, an improved design of sensing support and a rational damping mechanical structure may be operable to improve the performance of the micro inertial measurement system.

The sensing support is a key component for mounting a gyroscope, a measuring and controlling circuit board and a connecting wire. The sensing support may suffer a variety of violent vibration during operation, in which case a mounting surface for the gyroscope has the relative maximum amplitude. Therefore, dynamic properties for the structure of the mounting surface will definitely impact on the operating reliability and accuracy of the gyroscope. To minimize such impact, it is required to possess a certain static strength, anti-vibration strength and fatigue life. With respect to process, the support is required to be easy to mount and manufacture. Besides, the structure for the support is designed rationally as well as its rigidity and damping performance are improved, so that its inherent frequency is definitely significantly distinguished from the operating vibration frequency of a shaker of the gyroscope and the relative amplitude for the mounting surface of the gyroscope is minimized. In the prior art, a traditional method for optimizing the support is shown as follows: wall thickness is greatly increased to enhance the rigidity and increase the inherent frequency of the corresponding structure. In the present invention, the structural design is improved by optimizing material, shape and joint surface, instead of increasing thickness unilaterally, so as to enhance the structural rigidity and damping performance of the support. In addition, the conditionality between the support and a damping device should be resolved on the whole. The mounting position and the line route of the measuring and controlling circuit board on the support are also in the consideration.

It can be seen from the above description that, in order to overcome the above mentioned technical drawbacks for the inertial measurement system in the prior art, the following technical measures is taken in the present invention: a micro inertial measurement system is provided based on the concept of improving its mechanical structure, wherein the system has a greatly reduced volume and includes a damping structure with three-dimensional equal rigidity; the micro inertial measurement system is provided in such a way that harmful effects of various drawbacks including three-dimensional unequal rigidity, resonance excitation and torsional vibration on the strapdown inertial navigation system ore overcome.

A preferred embodiment of the present invention is shown in FIGS. 4-10. Such micro inertial measurement system comprises a sensing module 12, a damping unit, an upper housing 16 and a lower cover 18.

Wherein, the sensing module 12 comprises a sensing support 121, an inertial sensor 122 and a flexible measuring and controlling circuit board 123. In this embodiment, the sensing support 121 is a rigid and cube-shaped support satisfying certain requirements of specific gravity and rigidity. And the sensing support 121 is engraved with a groove on its respective surface.

The inertial sensor 122 comprises a gyroscope and an accelerometer. In particular, it comprises three gyroscopes and one accelerometer, all of which are welded onto the flexible measuring and controlling circuit board 123.

The flexible measuring and controlling circuit board 123 should have a function of preprocessing sensor signals. For this purpose, such flexible measuring and controlling circuit board 123 should comprise at least an anti-aliasing circuit and an A/D switching circuit. On one hand, a circuit board and connecting wire are made of flexible material to withstand the bending of 90°. On the other hand, the shape of the flexible measuring and controlling circuit board should be congruent to that of the developed plane of the sensing support, so that they can cover each surface of the sensing support completely and smoothly after they are bent by an angle of 90° along the edges of the sensing support.

In certain implementation, six circuit modules composed of the anti-aliasing circuit, the A/D switching circuit, the three gyroscopes and the one accelerometer are arranged on six flexible measuring and controlling circuit boards, respectively. Moreover, the circuit components on each flexible measuring and controlling circuit board are respectively embedded in the groove on its corresponding surfaces of the sensing support.

An inner cavity that is formed by the upper housing 16 and the lower cover 18 should have a shape similar to the configuration of the sensing module 12, and the volume of the inner cavity is relatively larger than that of the sensing module 12. As a result, respective space formed between each inside wall of the housing and the corresponding plane of the sensing module is approximately the same to each other, in which is installed an internal damping units 14.

The internal damper is composed of a number of internal damping units $\{K_i, c_i\}$ 14 with appropriate damping properties. Such Internal damping units are mounted between the inside wall S of the upper housing 16 and the six planes of the sensing module 12. The number of the internal damping units is determined depending on the vibration characteristics of different carriers, the maximum of which is 6. The sensing module is hung at the centre of the inner cavity of the housing. In this arrangement, the respective force axis of deformation for each internal damping unit is orthogonal to each other, and the elastic centre P of the damper coincides with the centroidal m of the sensing module, so that the forced vibration from the carrier is absorbed and consumed uniformly. In specific implementation, the damping unit is made of elastic matter with certain damping effect. Such elastic matter may be selected from but not limited to spring, rubber blanket, silica gel, sponge or any other damping matter.

In a preferred embodiment of the present invention, the sensing support 121 in the shape of a cube is made of metal material or non-metal material with a certain gravity and rigidity and manufactured using an integral forming process. The integral forming instead of assembling for a sensing support 121 is employed to ensure that rigidity of the support itself is enough to reduce measurement error caused by insufficient rigidity and anisotropy (referring to FIG. 5).

Figure 6:
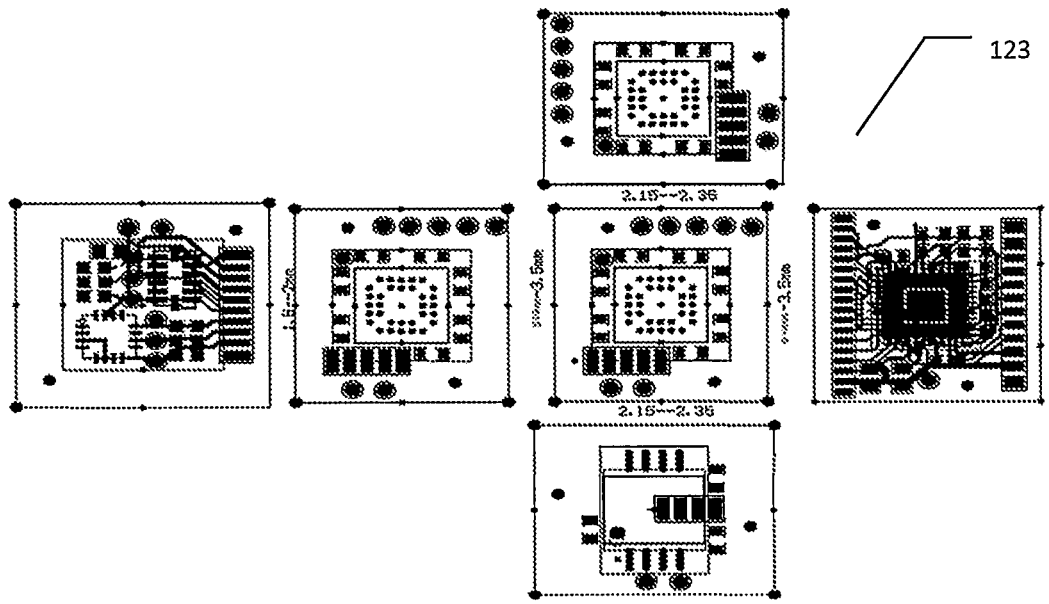
FIG. 6 is an outline view for a flexible measuring and controlling circuit board and an arrangement diagram for components on the flexible measuring and controlling circuit board; wherein the flexible measuring and controlling circuit board cooperates with the sensing support in the FIG. 5.

FIG. 6 is a schematic diagram illustrating the developed plane of a flexible measuring and controlling circuit board 123 and an arrangement for components thereon, according to a preferred embodiment of the present invention. The circuit substrate and the connecting wire of the flexible measuring and controlling circuit board 123 are both made of flexible material to withstand bending of 90°. Besides, its shape is designed to be congruent to that of the developed outer plane of the sensing support, such that the flexible measuring and controlling circuit board has six developed planes. Sensors and any other electronic components are respectively welded in appropriate positions on the front side of the six developed planes.

Figure 7:
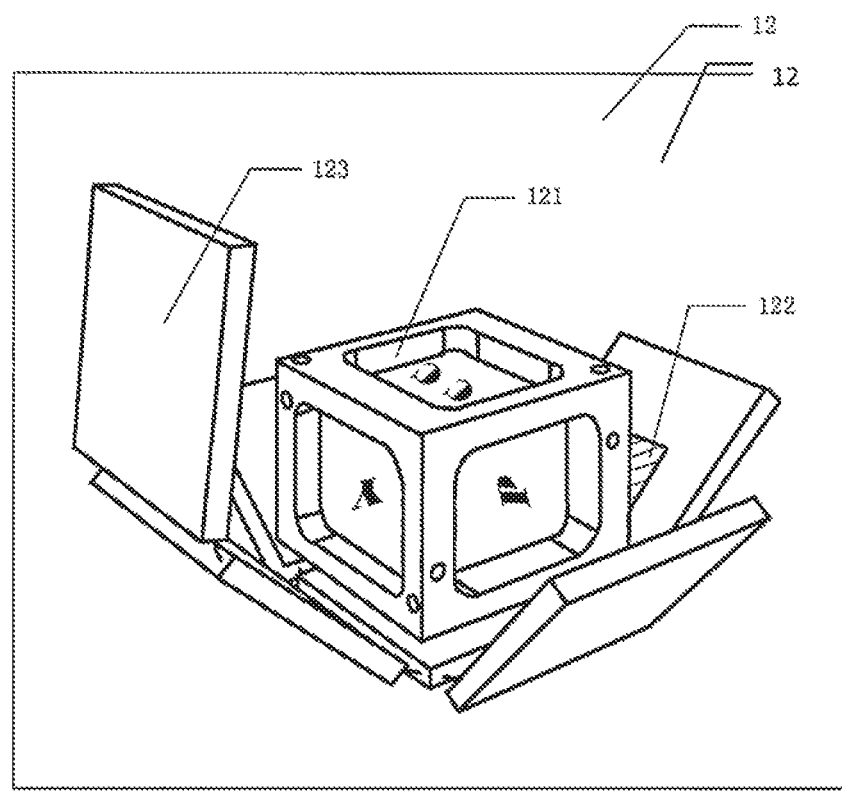
FIG. 7 is a schematic diagram for the composition of a sensing module in a preferred embodiment of the present invention.

FIG. 7 is a schematic diagram illustrating the structure of a sensing module in a preferred embodiment of the present invention. An inertial sensor 122 and any other electronic components are welded on the front side of the flexible measuring and controlling circuit board 123. The front side of the flexible measuring and controlling circuit board is attached to the sensing support 121 and bends by an angle of 90° along the edges of the sensing support. Then each sensor or electronic component is embedded into the groove on each surface of the sensing support. After that, the back side of the whole flexible measuring and controlling circuit board directs outward. Such that, the flexible measuring and controlling circuit board can enclose the sensing support together with the sensing component and electronic component therein, as well as cover each surface of the sensing support completely and smoothly.

In the present invention, the primary consideration for designing the strapdown inertial navigation damping system is how to avoid or reduce coupled vibration. If the mechanical structure of such system is irrational, the respective vibration in its six degrees of freedom will be coupled to each other, so as to produce a cross excitation of a linear vibration and an angular vibration. As a result, the detected data of the inertial measurement system would contain cross excitation information of its own, consequently a pseudo movement signal would be introduced into the system, which may significantly impact the measurement precision of the inertial navigation system. In order to reduce the interference produced by the damper during the measurement of angular motion of the system, the angular vibration frequency of the damping system should be significantly distinguished from the measuring bandwidth of the inertial navigation system. In the circumstances of broad-band random vibration, the lower the damping frequency is, the higher the damping efficiency is.

Figure 8:
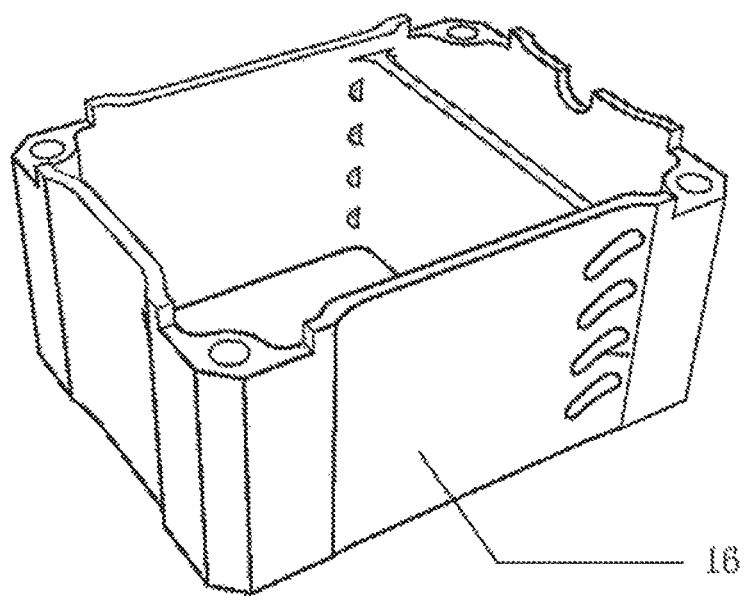
FIG. 8 is a structure diagram for a housing that cooperates with the sensing module in the FIG. 7.

FIG. 8 is a schematic diagram illustrating a housing 16 in a preferred embodiment of the present invention; wherein the housing 16 forms an inner cavity in the shape of cube together with a lower cover 18 (not shown in the figure for clarity). The inner cavity is used for holding the sensing module 12 and the damping units 14. In this case, compared with the shape of the sensing module 12, the inner cavity of the housing formed as mentioned above is designed to have the same shape, i.e. in the shape of cube, and have a relative larger volume. Upon such design, the respective space formed between each of the six inside walls of the housing and the corresponding one of the six outer surfaces of the sensing module has a nearly same shape and size to each other; wherein, the six inside walls of the housing are formed by the upper housing 16 and the lower cover 18. When the damping units 14 with approximately the same shape respectively are mounted in the space, an assembly of internal damper is completed, so as to provide relatively excellent damping effect.

Figure 9:
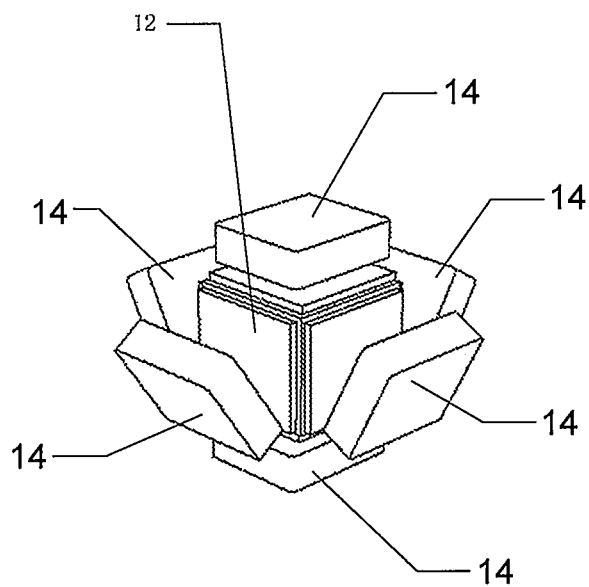
FIG. 9 illustrates the position relation between an internal damping unit and a sensing module that are employed in a preferred embodiment of the present invention.

FIG. 9 illustrates a position relation between an internal damper composed of all internal damping units 14 and a sensing module according to a preferred embodiment of the present invention. In the embodiment, in order to effectuate an effective attenuation or a complete absorption of the forced vibration on the sensing module 12 in the six degrees of freedom comprising front and back, right and left, and up and down degrees of freedom, six internal damping units 14, i.e. six damping pads of the same shape are mounted between the inside wall of the upper housing 16 and the sensing module 12; besides, the sensing module is hung at the centre of the inner cavity of the housing, and the respective force axis of deformation for each internal damping unit is orthogonal to each other, so that the forced vibration from the carrier is absorbed and consumed uniformly.

Figure 10:
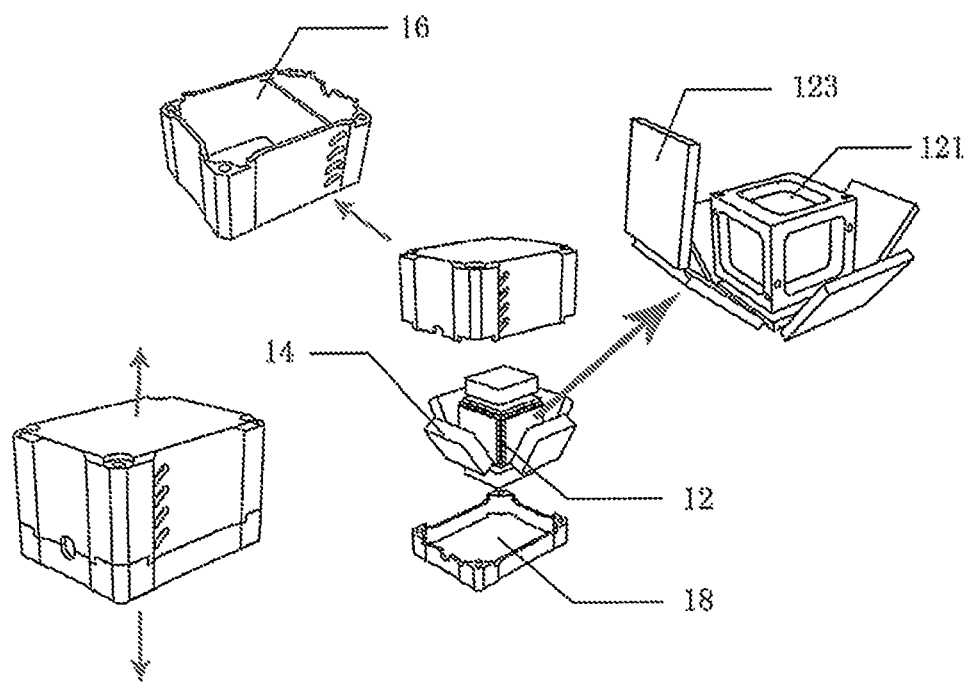
FIG. 10 is an assemblage diagrammatic sketch for a micro inertial measurement system in a preferred embodiment of the present invention.

FIG. 10 is an assemblage diagrammatic sketch for a micro inertial measurement system 2.1 in a preferred embodiment of the present invention. Due to a series of technical measures mentioned above, it is ensured that all of the inherent frequency, damping coefficient, damping efficiency and mechanical strength of the damper can meet the requirement of impact and vibration resistance. Such that, in the three coordinate systems of the micro inertial measurement system, i.e. an elastic coordinate system, an inertial coordinate system and a solution coordinate system, their respective corresponding coordinate axes are in parallel with each other, and the centroidal of the measurement system is coincident with the elastic centre of the damping device. In such optimal state, significant decoupling effect is achieved among vibrations in each degree of freedom, and the respective inherent frequency is approximate to each other to implement a technical effect of narrow frequency distribution.

The micro inertial measurement system of the present invention can be applied for UAVs, automatic driving aircraft, watercraft and underwater automatic detection equipment or various cars and robots and so on. Apart from the embodiments above, there are some other implementations for the present invention. For example, (1) the housing is not limited to be formed by the coordination between the upper housing and the lower cover; instead, it can be formed by the coordination between a lower housing and an upper cover or between a middle housing and an upper cover as well as a lower cover; (2) integrated processing can be performed on all or portions of the six functional modules of the flexible measuring and controlling circuit board, so that the number of the flexible measuring and controlling circuit board can be reduced to be less than six, and the number of the groove on the surface of the sensing support can be correspondingly reduced as well; (3) the support can be in the shape of cuboid and the structure of the circuit board is adjusted accordingly at this moment. It can be seen that all relevant and equivalent alternative technical solution should be within the scope of protection claimed by the present invention.

What is claimed is:

1. An inertial measurement device, the device comprising:
   a sensing module comprising a support and a measuring circuit board;
   a housing containing the sensing module; and one or more damping units arranged between the sensing module and the housing, wherein the measuring circuit board comprises three gyroscope circuit boards, each of the three gyroscope circuit boards comprises a front surface configured to support a gyroscope and a back surface opposite the front surface, and wherein the support comprises a plurality of external surfaces facing away from one another, the front surface of each of the three gyroscope circuit boards is coupled to and facing a corresponding external surface of the plurality of external surfaces with the gyroscope embedded within a groove on the corresponding external surface, each of the one or more damping units being in contact with the back surface of one of the three gyroscope circuit boards.

2. The device of claim 1, wherein the measuring circuit board is a flexible circuit board.

3. The device of claim 2, wherein the support comprises a cube-shaped structure comprising six external surfaces.

4. The device of claim 3, wherein the flexible circuit board comprises six panels and wherein each of the six panels substantially covers an external surface of the six external surfaces of the support when the flexible circuit board is folded.

5. The device of claim 1, wherein the measuring circuit board comprises an accelerometer circuit board configured to support an accelerometer, the accelerometer circuit board is coupled to another external surface of the plurality of external surfaces with the accelerometer embedded within a groove on the another external surface.

6. The device of claim 5, wherein the measuring circuit board comprises an anti-aliasing circuit and an A/D switching circuit, each of the anti-aliasing circuit and the A/D switching circuit is coupled to another external surface of the plurality of external surfaces with electrical components supported by the anti-aliasing circuit and the A/D switching circuit embedded within a groove on the another external surface.

7. The device of claim 1, wherein the back surface of the each of the three gyroscope circuit boards does not support any electrical components.

8. The device of claim 1, wherein at least one of the three gyroscope circuit boards is further configured to support an accelerometer.

9. The device of claim 1, wherein the one or more damping units are arranged relative to the sensing module such that an elastic center of the one or more damping units substantially coincides with a centroid of the sensing module.

10. The device of claim 1, wherein the one or more damping units comprise six damping units, each of the six damping units arranged between the sensing module and the housing.

11. The device of claim 1, wherein a shape of each of the three gyroscope circuit boards is congruent to a shape of the corresponding external surface of the support.

12. The device of claim 1, wherein the support is manufactured using an integral forming process.

13. An unmanned aerial vehicle (UAV), comprising:
a sensing module comprising a support and a measuring circuit board;
a housing containing the sensing module; and
one or more damping units arranged between the sensing module and the housing;

wherein the measuring circuit board is configured to generate a signal indicative of a rotation of the unmanned aerial vehicle, and comprises three gyroscope circuit boards, each of the three gyroscope circuit boards comprises a front surface configured to support a gyroscope and a back surface opposite the front surface, and wherein the support comprises a plurality of external surfaces facing away from one another, the front surface of each of the three gyroscope circuit boards is coupled to and facing a corresponding external surface of the plurality of external surfaces with the gyroscope embedded within a groove on the corresponding external surface, each of the one or more damping units being in contact with the back surface of one of the three gyroscope circuit boards.

14. The UAV of claim 13, further comprising a control computer operably coupled to the measuring circuit board and configured to receive and process the signal in order to determine the rotation of the unmanned aerial vehicle.

15. A method for fabricating an inertial measurement device, comprising:
providing a support comprising a plurality of external surfaces; and
providing a measuring circuit board comprising three gyroscope circuit boards, each of the three gyroscope circuit boards comprises a front surface configured to support a gyroscope and a back surface opposite the front surface;
coupling the front surface of each of the three gyroscope circuit boards respectively to a corresponding external surface of the plurality of external surfaces by embedding the gyroscope within a groove on the external surface, thereby forming a sensing module with the front surface of each of the three gyroscope circuit boards facing the corresponding external surface of the support; and
arranging one or more damping units on the back surface of each of the three gyroscope circuit boards, so as to position the damping units between the sensing module and a housing containing the sensing module.

16. The method of claim 15, wherein the measuring circuit board further comprises an accelerometer circuit board configured to support an accelerometer, and wherein the method further comprises coupling the accelerometer circuit board to another external surface of the plurality of external surfaces by embedding the accelerometer supported by the accelerometer circuit board within a groove on the another external surface.

17. The method of claim 15, wherein the measuring circuit board comprises an anti-aliasing circuit and an A/D switching circuit, and the method further comprises coupling the anti-aliasing circuit and the A/D switching circuit respectively to another external surface of the plurality of external surfaces by embedding electrical components supported by the anti-aliasing circuit and the A/D switching circuit within a groove on the another external surface.

18. The method of claim 15, further comprising mounting the housing onto an unmanned aerial vehicle.

19. The method of claim 15, wherein the support comprises a cube-shaped structure comprising six external surfaces.

20. The method of claim 15, wherein the measuring circuit board is a flexible circuit board.

* * * * *